(12) United States Patent
Petrovic et al.

(10) Patent No.: US 8,106,744 B2
(45) Date of Patent: Jan. 31, 2012

(54) REMOTE CONTROL SIGNALING USING AUDIO WATERMARKS

(75) Inventors: Rade Petrovic, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 991 days.

(21) Appl. No.: 11/821,203

(22) Filed: Jun. 22, 2007

(65) Prior Publication Data

US 2007/0247278 A1     Oct. 25, 2007

Related U.S. Application Data

(60) Continuation of application No. 10/794,520, filed on Mar. 5, 2004, now abandoned, which is a division of application No. 09/505,080, filed on Feb. 16, 2000, now Pat. No. 6,737,957.

(51) Int. Cl.
*G05B 19/00* (2006.01)
*G06F 7/00* (2006.01)
*H04B 1/00* (2006.01)
*H04L 9/14* (2006.01)

(52) U.S. Cl. .................. 340/5.28; 340/5.42; 340/12.5; 340/13.24

(58) Field of Classification Search .............. 340/5.28, 340/5.42, 825.69, 825.72; 380/54, 201, 203, 380/44; 726/4, 28; 382/100, 237, 250, 232; 713/176, 178, 179; 283/72; 399/366
See application file for complete search history.

(56) References Cited

U.S. PATENT DOCUMENTS

| 4,593,904 | A | * | 6/1986 | Graves ............................ 463/9 |
| 4,755,871 | A | * | 7/1988 | Morales-Garza et al. ...... 725/24 |
| 4,807,031 | A | | 2/1989 | Broughton et al. |
| 4,840,602 | A | | 6/1989 | Rose |
| 4,972,471 | A | | 11/1990 | Gross et al. |
| 5,057,915 | A | * | 10/1991 | Von Kohorn .................... 463/9 |
| 5,113,437 | A | | 5/1992 | Best et al. |
| 5,191,615 | A | | 3/1993 | Aldava et al. |
| 5,213,337 | A | | 5/1993 | Sherman |
| 5,270,480 | A | | 12/1993 | Hikawa |
| 5,319,735 | A | | 6/1994 | Preuss et al. |
| 5,452,901 | A | * | 9/1995 | Nakada et al. ................ 446/454 |
| 5,581,800 | A | | 12/1996 | Fardeau et al. |
| 5,592,553 | A | * | 1/1997 | Guski et al. ................... 713/159 |
| 5,719,619 | A | | 2/1998 | Hattori et al. |
| 5,752,880 | A | | 5/1998 | Gabai et al. |

(Continued)

OTHER PUBLICATIONS

Xu et al., "Applications of Digital Watermarking Technology in Audio Signals," J. Audio Eng. Society, vol. 47, No. 10, Oct. 1999, pp. 805-811.

(Continued)

*Primary Examiner* — Nam V Nguyen
(74) *Attorney, Agent, or Firm* — Perkins Coie LLP; Donald Wenskay

(57) ABSTRACT

A system for using a watermark embedded in an audio signal to remotely control a device. Various devices such as toys, computers, and appliances, equipped with an appropriate detector, detect the hidden signals, which can trigger an action, or change a state of the device. The watermarks can be used with a "time gate" device, where detection of the watermark opens a time interval within which a user is allowed to perform an action, such as pressing a button, typing in an answer, turning a key in a lock, etc.

57 Claims, 6 Drawing Sheets

U.S. PATENT DOCUMENTS

| | | | |
|---|---|---|---|
| 5,822,360 | A | 10/1998 | Lee et al. |
| 5,822,432 | A | 10/1998 | Moskowitz et al. |
| 5,828,325 | A | 10/1998 | Wolosewicz et al. |
| 5,832,119 | A | 11/1998 | Rhoads |
| 5,893,067 | A | 4/1999 | Bender et al. |
| 5,905,800 | A | 5/1999 | Moskowitz et al. |
| 5,933,798 | A | 8/1999 | Linnartz |
| 5,940,135 | A | 8/1999 | Petrovic et al. |
| 5,943,422 | A | 8/1999 | Van Wie et al. |
| 6,031,914 | A * | 2/2000 | Tewfik et al. ............... 380/54 |
| 6,061,793 | A | 5/2000 | Tewfik et al. |
| 6,094,228 | A | 7/2000 | Ciardullo et al. |
| 6,154,571 | A * | 11/2000 | Cox et al. ................. 382/250 |
| 6,160,986 | A * | 12/2000 | Gabai et al. ............... 434/308 |
| 6,175,627 | B1 | 1/2001 | Petrovic et al. |
| 6,209,094 | B1 * | 3/2001 | Levine et al. ............. 713/176 |
| 6,389,152 | B2 | 5/2002 | Nakamura et al. |
| 6,411,725 | B1 * | 6/2002 | Rhoads ..................... 382/100 |
| 6,427,012 | B1 | 7/2002 | Petrovic |
| 6,449,496 | B1 * | 9/2002 | Beith et al. ................ 455/563 |
| 6,490,355 | B1 * | 12/2002 | Epstein ..................... 380/203 |
| 6,571,144 | B1 * | 5/2003 | Moses et al. ............... 700/94 |
| 6,592,516 | B2 * | 7/2003 | Lee ............................ 600/38 |
| 6,661,905 | B1 | 12/2003 | Chupp et al. |
| 7,164,778 | B1 * | 1/2007 | Nakamura et al. ......... 382/100 |
| 2003/0037075 | A1 | 2/2003 | Hannigan et al. |

OTHER PUBLICATIONS

Lacy et al., "Intellectual Property Protection Systems and Digital Watermarking," Information Hiding 1998, LNCS 1525, 1998, pp. 158-168.

Boney et al., "Digital Watermarks For Audio Signals," Department of Electrical Engineering, University of Minnesota, Mar. 27, 1996. (4 pages).

* cited by examiner

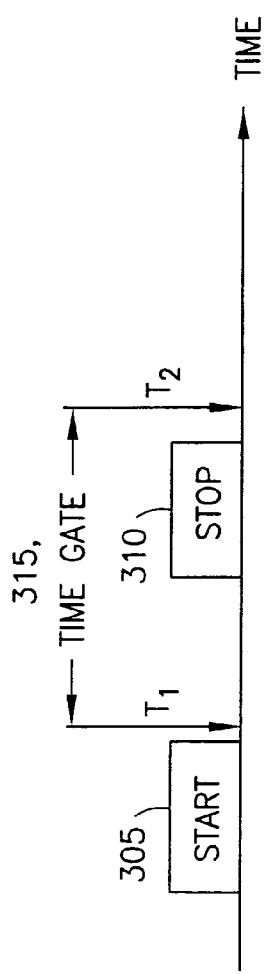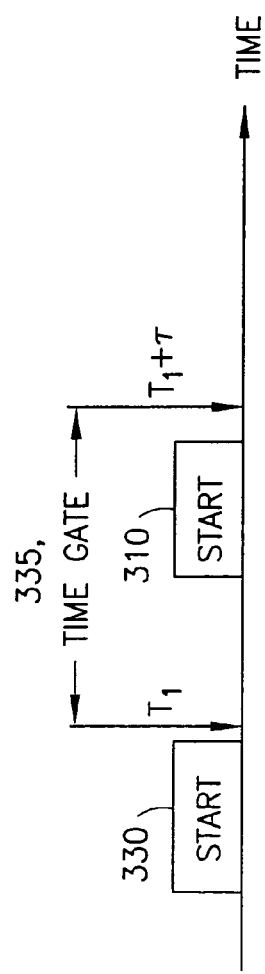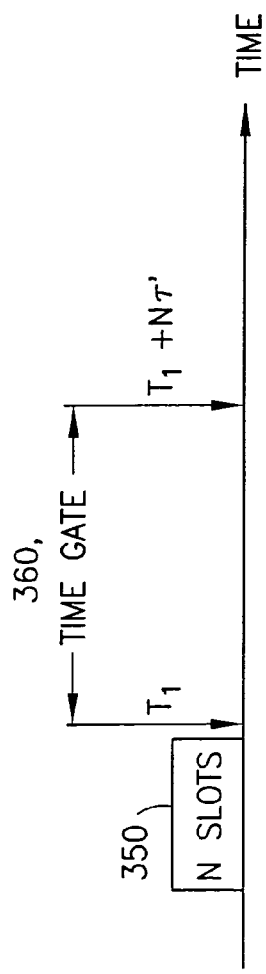

REMOTE CONTROL SIGNALING USING AUDIO WATERMARKS

This application is continuation of commonly assigned U.S. patent application Ser. No. 10/794,520 filed on Mar. 5, 2004, now abandoned, which is a divisional of U.S. patent application Ser. No. 09/505,080 filed on Feb. 16, 2000, now U.S. Pat. No. 6,737,957.

BACKGROUND OF THE INVENTION

The present invention relates to a method and apparatus for remotely controlling a device, such as a toy, lock, smart card, or home appliance, via a control message that is imperceptibly embedded in an audio signal, e.g., as a "watermark". Moreover, the invention optionally enables the device to be synchronized with the audio signal, for example, so that the actions of a doll can be synchronized with a children's television program.

Audio signals are ubiquitous, being broadcast over AM/FM radio, TV, public announcement systems, transmitted over telephone channels, or stored on cassette tapes, CDs, computer memories, etc. Therefore, it is convenient to use audio channels or audio storage to transmit or store some other information.

Audio watermarking, or embedded signaling, has recently emerged as a technology for embedding auxiliary data imperceptibly in a host audio signal. A basic feature of audio watermarking techniques is that the embedded signal is substantially imperceptible to a listener of the host signal. Furthermore, the audio-watermarks occupy the same time/frequency/space domain as the host signal, so that they are not lost in standard audio signal processing, recording or transmissions, nor filtering and/or masking operations in a deliberate attack can remove them.

A primary proposed use of watermarking is in protecting intellectual property rights, e.g., through copy control, automatic broadcast monitoring, ownership dispute resolution, Internet commerce tracking, etc. Alternative applications include auxiliary data embedding, such as the song title and purchasing instructions, assurance of content integrity, proof of performance in TV and radio advertisements, audience exposure monitoring, caller identification (authentication) in telephone conversations, or generic covert communication.

Moreover, various schemes have been proposed for sending command and control signals, or their equivalent, concurrently with audio signals. However, these schemes do not qualify as audio watermarking techniques. For example, in one proposed scheme, an "instructional signal" is inserted in a narrow frequency band set aside at the upper frequency edge of the audio spectrum. However, this system does not qualify as a watermarking system since the host and the control signals occupy distinct frequency bands.

In another proposed scheme, a unique code describing an offer for products and services is transmitted by a TV program as an audible "beep". There is no attempt to hide this beep, so this technique also is not audio watermarking.

In yet another proposed scheme, information related to a TV game show is encoded in touch tones and broadcast in-band with an audio portion of the show. The touch-tones can be masked by the show's usual sound effects, such as buzzers and beeps. This is substantially different from the watermarking approach, because it cannot simultaneously meet the inaudibility requirement and the requirement for the time domain overlap of a watermark and an arbitrary audio signal.

Accordingly, it would be desirable to provide a watermarking system for sending command and control signals concurrently with audio signals that overcomes the disadvantages of the existing proposed schemes.

The system should use watermarking techniques to provide a hidden data channel in an audio signal for providing short messages, such as device activation commands, or remote control signals that can change the state of a device.

The system should be compatible with existing watermaking techniques, such as those disclosed in U.S. Pat. No. 5,940,135 to Petrovic at al., entitled "Apparatus and Method for Encoding and Decoding Information in Analog Signals," issued Aug. 17, 1999, and incorporated herein by reference.

The system should provide a hidden remote control signal as a watermark within an audio signal for controlling various devices that detect the hidden signal.

The system should allow the remote control signal to be related to, or independent of, content of the host audio signal. For related content, the system should optionally provide synchronization of the remote control signal with the host audio signal content.

The system should use a watermark to define a time gate (window) during which a device is enabled to receive a user input or perform a specified action.

The system should provide a security mechanism to ensure that the time gate is defined only from a real-time broadcast audio signal, and not from a replay of the audio signal.

The system should improve the robustness and temporal resolution of a watermark, and provide a simplified watermark detector.

The system should provide synchronization of a watermark encoder and decoder.

The present invention provides a system having the above and other advantages.

SUMMARY OF THE INVENTION

The present invention relates to a system for using a watermark embedded in an audio signal to remotely control a device.

In particular, the system is compatible with existing audio-watermarking technologies that use audio channels and/or audio storage to carry independent data without interfering with the audio channel's original purpose. However, such a channel has much lower information capacity than a modem channel, typically no more than about twenty bits per second per audio channel. The invention uses this hidden data channel for relatively short messages, such as device activation commands, or remote control signals that can change state of a device.

A remote control signal is hidden within an audio signal that is broadcast over radio and TV, stored on CDs, DVD, tape or computer memory, played over speakers and/or transmitted over other audio channels. Various devices such as toys, computers, and appliances, that are equipped with an appropriate detector, detect the hidden signal to trigger an action, or change a state of the device. The device action can be completely unrelated to the ongoing audio content, and it can have a number of different objectives, such as entertainment, education, sales, security, etc.

In one particular implementation, a "time gate" device is disclosed, where detection of the watermark opens a time interval within which a user is allowed to perform an action, such as pressing a button, typing in an answer, turning a key in a lock, etc. To prevent fraudulent activation of a time gate, the time gate device can be further upgraded to react only to watermarks coming from live broadcasts, and not from replays from tapes or other storage devices.

In another implementation, detection of the watermark triggers an action.

Additionally, techniques are presented for improving existing watermarking technology in view of requirements for the proposed applications. In particular, the invention provides improvements in robustness of the watermark in the channels with acoustic propagation (e.g., propagation through air)—using delay hopping (watermarking adjacent bits using distinct autocorrelation delays), robustness improvements using redundant watermarking, improvements in the time resolution of the trigger feature, and simplifications of the detector design.

BRIEF DESCRIPTION OF THE DRAWINGS

FIG. 3(a) illustrates a time gate defined by start and stop watermarks in accordance with the present invention.

FIG. 3(b) illustrates a time gate defined by a start watermark and a fixed interval τ in accordance with the present invention.

FIG. 3(c) illustrates a time gate defined by a start watermark and a multiple N of a fixed interval τ' in accordance with the present invention.

DETAILED DESCRIPTION OF THE INVENTION

The present invention relates to a system for using a watermark embedded in an audio signal to remotely control a device.

Figure 1:
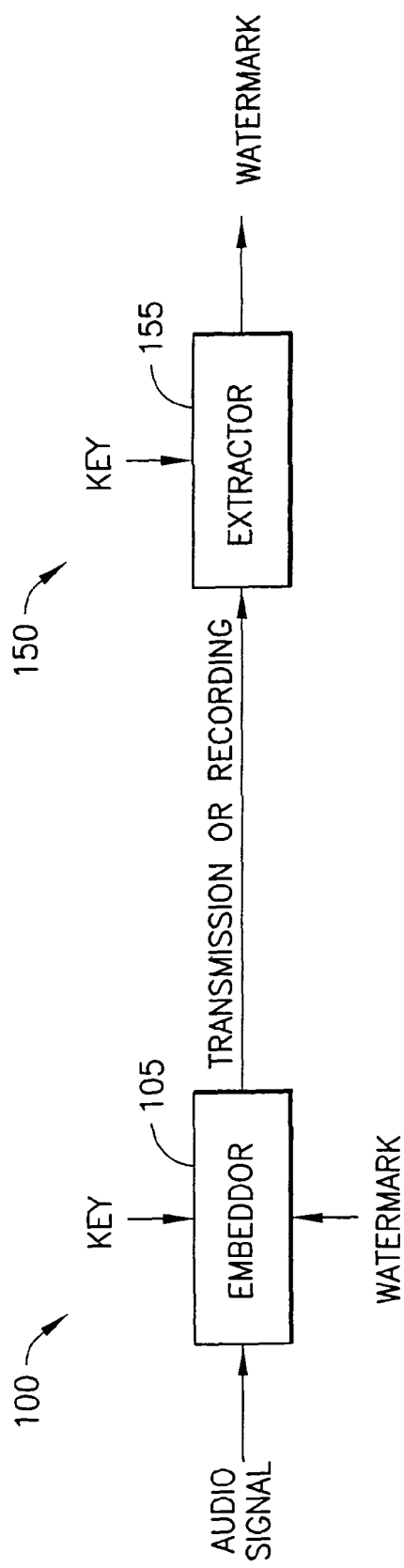
FIG. 1 illustrates an audio watermarking process in accordance with the present invention.

FIG. 1 illustrates an audio watermarking process in accordance with the present invention.

At an encoding side 100, a watermark, i.e., an embedded signal, is inserted into an audio signal at an embeddor 105, using a key, which is a set of parameters that define the hiding process. The key may comprise a steganographic key. The composite signal that is output from the embeddor 105 can be recorded, transmitted over various channels, or processed in different ways, which usually includes corruption by noise and distortion.

The composite signal is received at a decoding side 150, where the embedded signal (watermark) is retrieved from the composite signal in an extractor 155 with the help of the key used in the embedding process.

Various details regarding conventional signal processing techniques, such as compression, coding, error-correction, modulation, and the like, are not explicitly disclosed but their appropriate use will be evident to those skilled in the art.

The embeddor 105 may provide the watermark in the audio signal using various known watermarking techniques, including those discussed in the aforementioned U.S. Pat. No. 5,940,135, where the short-term autocorrelation function of the host audio signal is modulated in such a way to match the embedded signal.

The key contains the information about the frequency band of the host signal used for hiding, the delay set used for autocorrelation calculation and its change patterns, baseband symbol waveform, data packet structure, scrambling key, etc. With this system, the extractor 155 calculates the short-term autocorrelation using the same key, and regenerates the inserted message with the help of standard digital signaling techniques.

Typical bit rates of the embedded messages are low, ranging from a few bits per second to a few tens of bits per second. For example, the International Federation of the Phonograph Industry required 20 bps per channel for its review of watermarking technologies. Those skilled in the art can appreciate that the increase in the bit rate brings reduced robustness, increased audibility and/or increased complexity. Therefore, only relatively short messages can be hidden within an audio signal. This is quite suitable for intellectual property protection, where copy control information and/or content identification codes of less than one-hundred bits are embedded.

However, the present invention proposes the use of audio watermarks for remote control of various devices, such as toys, locks, smart cards, appliances, etc., over standard audio channels, such as radio and TV broadcasts, audio tapes, CDs, telephone channels, public address systems, etc. As an example, we will describe a system for remote control of toys participating in a TV show, as illustrated on FIG. 2.

Figure 2:
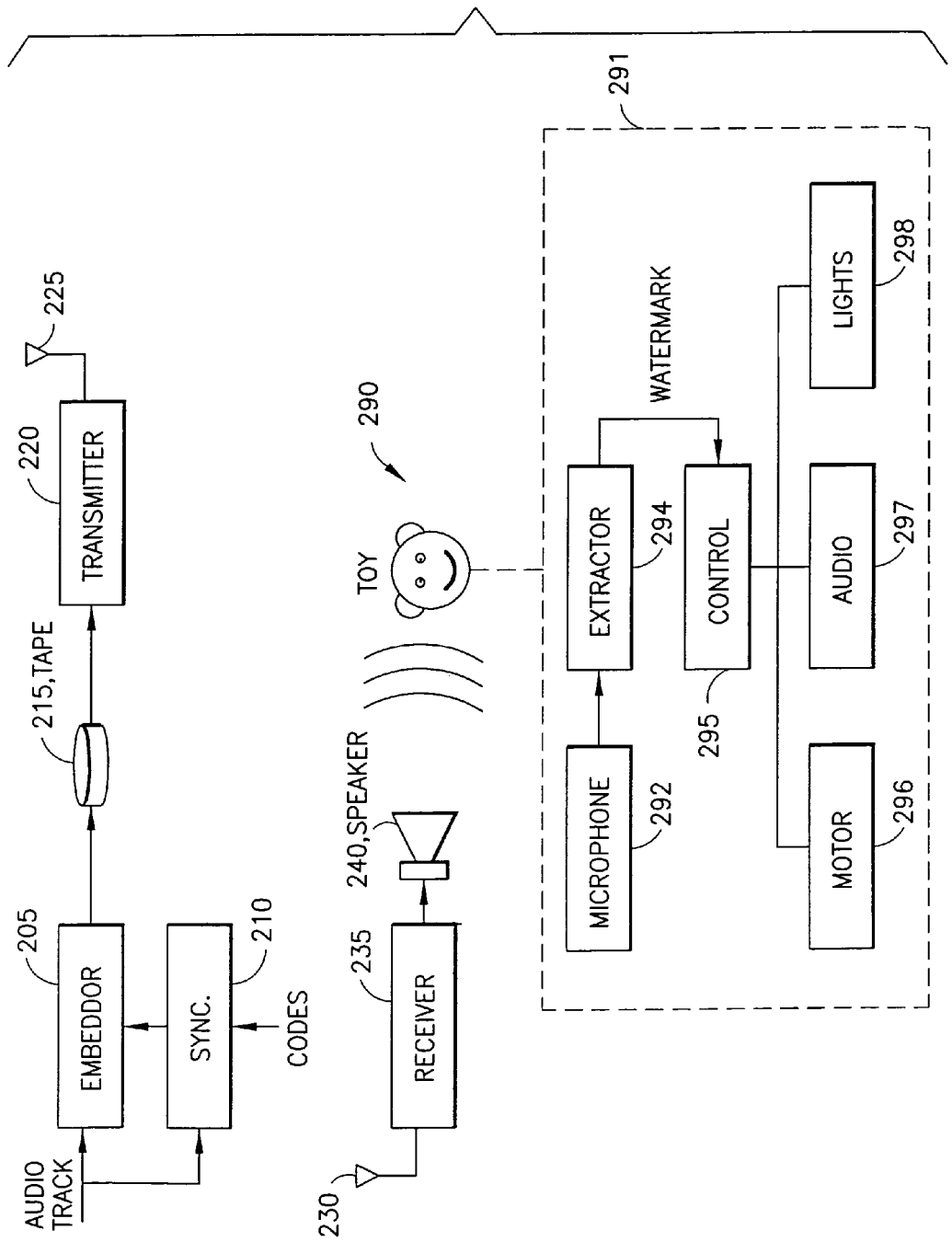
FIG. 2 illustrates a system for remote control of a device, such as a toy, in synchronism with audio data, such as from a television program, in accordance with the present invention.

FIG. 2 illustrates a system for remote control of a device 290, such as a toy, in synchronism with audio data, such as from a children's television program, in accordance with the present invention.

The control messages are inserted using audio watermarking at appropriate places of the show's audio track using an embeddor 205 and a synchronization device 210. The composite audio signal is optionally stored, e.g., on a tape 215, and subsequently broadcast via a transmitter 220 and antenna 225. While antennas 225 and 230 are shown as an illustration, any type of broadcast scheme can be used, including delivery via a terrestrial path, cable, optical fiber, and/or computer network. Moreover, broadcast of the composite signal to a large population of receivers is not required, as the invention is also suitable for any transmission, including point-to-point transmissions, video-on-demand transmissions in a cable television network, and so forth. Moreover, the composite audio signal may be played back locally at a user's home from a storage device such as a tape or disc.

A TV receiver 235 receives the signal via an antenna 230 and the audio signal is played over a TV speaker 240. The toy 290, specially designed in accordance with the present invention, includes components 291, including a built-in microphone 292 for picking up (detecting) the audio signal, a watermark extractor 294 for extracting the watermarks from the composite audio signal, and a control 295 that is responsive to the watermarks for performing some action.

The toy 290 may optionally be hard-wired to the receiver using appropriate jacks and wiring, in which case the microphone 292 is not needed.

A motor 296, audio function 297, such as a speech synthesizer, and lights function 298 are responsive to the control 295. For example, if the toy 290 is a doll, the audio function 297 may play a prerecorded message in concert with the ongoing show. The motor 296 may cause the toy's 290 arms, legs, head and/or mouth to move. The lights function 298 may cause the toy's eyes to light up. This creates the appealing impression that the toy is actually following the show together with the children, and that it participates.

Advantageously, no modification is required for the TV channel, including the TV signal storage equipment, satellite distribution channels, broadcast equipment, and TV sets. Additional equipment consists only of an embeddor, specially designed for precise watermark insertion at a desired segment of the audio track, and a mass-produced, inexpensive detector incorporated in a suitably-designed toy and connected to the toy controller 295. Also, note that the same toy 290 can be activated by audio watermarks coming from any audio source, such as an AM/FM radio broadcast, CD or tape player, or speakers wired to a computer.

An important feature in the previous example is the synchronization of the action of a toy (or toys) with the ongoing show. To achieve this, the watermark should be embedded in the audio track segment immediately preceding the desired moment of the toy action, with a small allowance for processing and propagation delays. This synchronizing feature can be useful in many other practical applications.

Time Gate

For example, we will describe here a device suitable for watermark-based activation that we will call a "time gate" (e.g., window). In accordance with the invention, the detection of a watermark causes the time gate to open a time interval, during which a user is allowed to perform an action. For example, during an interactive TV quiz show, the viewers may participate by keying in their answers to a hand-held unit, while the players in the television studio prepare their answers. This can be achieved if the audio track has appropriately inserted watermarks, and if a time gate device synchronized to the watermarks controls access to the hand-held unit.

Such a hand-held unit can have similar componentry as the toy 290 of FIG. 2. The control 295 can be configured to send a message to the user to alert the user that the time gate has started or ended, the duration of the time gate, and the amount of time remaining in the time gate. An output screen on the hand-held unit, such as a liquid-crystal display (LCD), may be appropriate for this purpose. Or, the hand-held unit may send a signal back to the television receiver 235 to provide a display on a TV or computer screen that informs the user of the information provided by the watermark (e.g., via a wired path, infra-red signal or the like).

Alternative applications including an automated audio/video exam, where the time gate defines a period during which the user can enter responses for the exam, alertness monitoring, where the user is required to provide an input during the time gate, TV coupon collection, where electronic coupons can be retrieved by a user during the time gate, remote control of a lock, where the lock can be opened or closed only during the time gate, and so forth, are discussed below.

Three different designs of the time gate protocol are illustrated in FIGS. 3(*a*)-3(*c*).

FIG. 3(*a*) illustrates a time gate defined by start and stop watermarks in accordance with the present invention.

This design uses two distinct watermarks, including a start watermark 305 and a stop watermark 310, to mark the desired beginning and the end, respectively, of the gated interval 315 bounded by $T_1$ and $T_2$. Note that the boundaries of the interval 315 are shown as occurring slightly after the end of the corresponding watermarks, due to processing and propagation delays. This design can mark an arbitrary time interval that is larger than the duration of the stop watermark 310, since the duration of the stop watermark 310 consumes a portion of the time gate 315.

FIG. 3(*b*) illustrates a time gate defined by a start watermark and a fixed interval $\tau$ in accordance with the present invention.

This time gate protocol design is simpler than that of FIG. 3(*a*) since it requires a single start watermark 330 before the beginning of the marked interval 335. The duration of the marked interval-(time gate), $\tau$, is predefined, e.g., at the time the device, such as the toy 290 in FIG. 2, is manufactured. However, the interval may be re-programmable (e.g., by replacing a memory chip). This design is suitable if the user action is simple, like pressing a button, or turning a key in a lock.

FIG. 3(*c*) illustrates a time gate defined by a start watermark and a multiple N of a fixed interval $\tau'$ in accordance with the present invention.

This time gate design requires a single watermark 350, but still can mark a variable time interval. This is achieved by inserting an integer number N into the watermark's data field, where the interval 360 is N times a predefined time slot duration $\tau'$.

The value N can be carried in a separate or same watermark as that of the control data, or even provided beforehand. A preferred solution is for the same watermark 350 to include both N and the control data (for reasons of efficiency, potential for false action, etc.)

Figure 4:
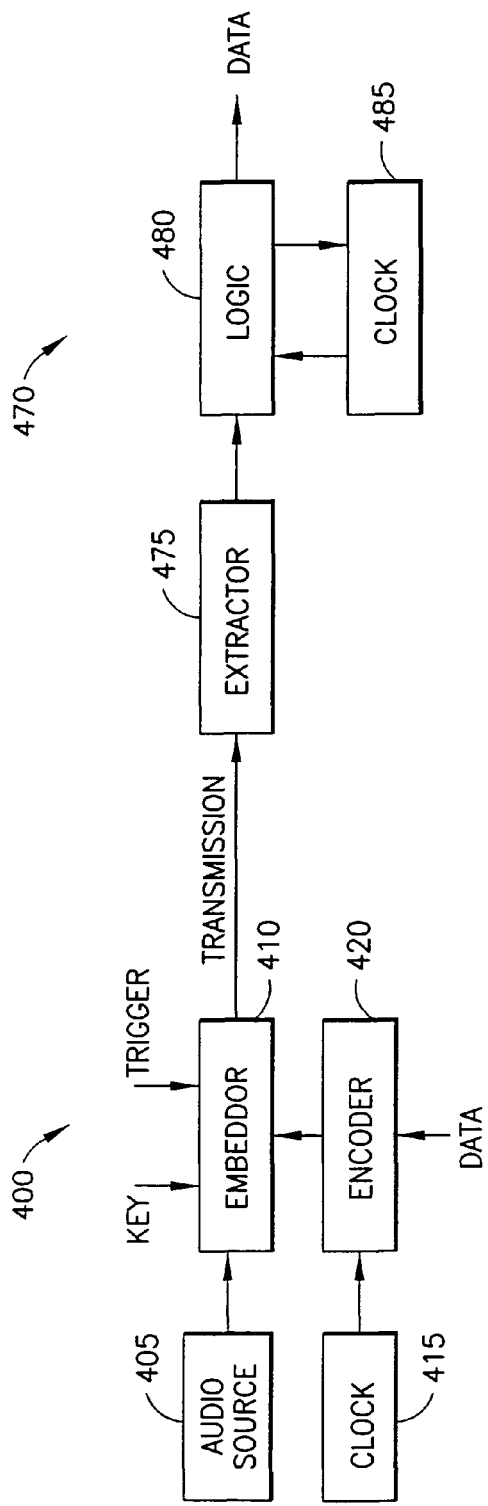
FIG. 4 illustrates a real-time time gate application in accordance with the present invention.

FIG. 4 illustrates a real-time time gate application in accordance with the present invention.

Many time gate applications allow pre-processing of the audio track in a similar manner as depicted in FIG. 1, e.g., for toy applications. For example, the time gate device can be used in an educational process to monitor alertness of the student. In this case, a pre-recorded lecture (video/audio, or audio only) contains a watermarked content that opens a time gate interval after questions/instructions that require the student's response, such as pressing yes/no buttons on the time gate device. The device may score correct/incorrect answers for review by a teacher, but we expect major educational benefits by simply confirming that the student was paying attention to the audio signal.

Similarly, an advertisement company may poll viewers about an advertised product, and engage their attention. Active participation of users is expected to bring better recognition of products in a shorter time, and lower advertisement costs. In particular, as an encouragement for participation, an advertiser may offer discounts to those who bring the time gate device to a specified retail store, where the user's answers to the poll questions are downloading from the device. This is equivalent to bringing cut-out coupons from a paper advertisement. Again, the watermarks are pre-stored in the audio track of a TV or radio adds.

However, in other applications, the embedding of the watermark should occur in real-time, while the audio signal is being transmitted. Such a case occurs when the time gate is used, for instance, to control a user's access to a secure area or safe box, or to override other restrictions. For example, an innocuous public address system announcement or background music may be used with an electronic lock to allow a key to operate within the defined time interval. Similarly, a user may remotely control a door lock in the user's residence by calling home over a telephone line, and speaking to the telephone answering machine (with its speaker on). The user's telephone set includes an encoder that embeds watermarks with control data into the user's voice. When the voice is received at a decoder with a watermark extractor at an electronic door lock mechanism, the lock can be activated.

In a related example, background music or a public address announcement in a larger facility such as an office may be used as a host audio signal for watermarked control data to remotely lock or unlock doors, filing cabinets and so forth without requiring re-wiring of the facility.

With these applications, it is important that there is no detectable communication channel between the user and the controlled device, so that potential attackers are oblivious to the control mechanism. Furthermore, if an attacker does learn the operational principle of the lock, he/she should not be able to gain access to the secure area by recording and subsequently replaying the audio signal with the embedded control data.

Even if an attacker knows the operational principle of the lock, he/she cannot forge the message if he/she does not know the secret key used in the embedding process, as shown in FIG. 1.

The real-time time gate system shown in FIG. 4 addresses these concerns. An encoding side 400 includes an audio source 405, an embeddor 410, a clock 415 and a control data encoder 420. A receiving side 470 that receives the real-time transmission of the composite audio signal includes an extractor 475, a logic function 480, and a clock 485.

The embeddor 410 receives a continuous audio signal from the audio source 405, and also receives a string of messages from the data encoder 420. The messages include the control data, as well as timing information from the local clock 415, with possibly some additional data (e.g., number of slots for slotted time gate). The message embedding is triggered from outside, e.g., by an operator pressing a button on the embeddor 410. The message is inserted into the audio data stream using a secret key. In the real-time operation, the message is immediately transmitted, i.e., there is no recording of the audio signal except for a short buffering in the embeddor 410 necessary for the embedding process (up to a few tens of milliseconds). The output composite signal is transmitted over a standard audio channel (telephone, radio, TV, public announcement system, etc). The receiver 470 detects the signal and passes it to the extractor 475, which detects the message and passes it to the logic function 480 for verification.

The logic function 480 compares the timing data from the incoming message to locally-generated timing data from the clock 485. If the match is sufficiently close, the logic function 480 concludes that a real-time transmission has occurred, and the control information taken from the received message is passed, e.g., starting the time gate. Simultaneously, the local clock 485 may be adjusted (e.g., synchronized with the clock 415) if the discrepancy with the transmitter clock 415 is within predefined bounds. However, if the time discrepancy is too large (e.g., the local time is significantly after the transmitted time), it implies that recording and play back may be taking place, so the message is ignored.

If the local time is significantly before the transmitted time, this implies a significant mis-calibration, and a default mode can be invoked to ignore the message.

Clearly, potential attacks based on storing and replaying messages would introduce large delays, certainly more than a few seconds. On the other hand, propagation and processing delays are certainly less than a second, so there should be a clear separation of the two cases. Also, typical clock devices can maintain a timing error well below a couple of seconds for a quite long time, so that the time drift of local clocks can be also distinguished from the store-and-replay attack. Occasional re-synchronization of the receiver clock with the transmitter's clock should keep the timing mismatch between the send and receive clocks within tight bounds indefinitely. This re-synchronization can be achieved using known techniques.

Watermark Design Considerations

The applications described above impose somewhat different sets of requirements on the audio watermark design than do the intellectual property protection applications. For example, most of the applications described above imply an acoustic (free-space) propagation channel, while the property rights establishment is usually done on an electronic form of the audio signal. The use of an acoustic propagation channel is especially challenging since it generates intersymbol interference due to multipath, signals may be corrupted with background noise, and the distortions in speakers and microphones are usually large compared to electronic channel distortions.

Furthermore, some of the above applications, such as the toy applications, require very inexpensive designs for the watermark extractors. On the other hand, in some other applications, such as remote control of locks, it is equally important to have an inexpensive embeddor as well, e.g., for the telephone set example. Finally, the time gate device requires careful consideration of timing tolerances to achieve the best possible resolution in time domain, as opposed to typical copyright protection applications, where the location of the watermark within a signal is relatively unimportant.

With the above requirements in mind, the present inventors looked at different watermarking technologies, and found that the best-suited technology is the autocorrelation modulation (ACM) technique described in the aforementioned U.S. Pat. No. 5,940,135. However, any other suitable watermarking/data embedding technique may be used.

ACM features a simple design for the embeddor and extractor, high robustness, large throughput, low probability of falses, good layering capability, and full inaudibility. However, the present invention provides improvements and the special selection of design parameters to optimize ACM for the proposed applications. Herein, several techniques are disclosed that can substantially improve the performance of ACM in remote control signaling using audio watermarks.

The acoustic-coupling environment, where a speaker broadcasts an audio signal, and the detector captures it through a microphone, can be improved by a special watermark design that is not addressed by conventional techniques. The main issue is the multipath propagation caused by reflections of acoustic waves, which may introduce intersymbol interference to the watermark detector. Standard techniques to fight intersymbol interference, such as adaptive equalization, are too costly for an inexpensive detector. An increase in the bit interval is helpful, but with obvious drawback in the reduction of the watermark bit rate.

To avoid intersymbol interference, we propose watermarking adjacent bits using distinct autocorrelation delays ("delay hopping"). In effect, distinct autocorrelation delays can be considered as distinct channels, with little interference between them. This aspect of the invention increases the watermark robustness, which is particularly useful in the acoustic-coupling environment, but may be used in other environments as well. That is, if consecutive symbols are sent over distinct channels, they cannot cause intersymbol interference, regardless of the pulse broadening caused by a multipath environment.

In a further aspect of the invention, robustness of the watermarking is improved by first evaluating the masking ability of the host audio signal before embedding the watermark. In a typical scenario, the device activation, time gate opening, or other actions occur upon detection of the corresponding watermark. This means that the encoder should insert the watermark immediately prior to the desired moment, taking into account propagation and processing delays. However, the desired (candidate) watermark insertion interval may be unsuitable, for example, if it is mainly a silence. Accordingly, the watermark can be inserted before the desired instant of action, along with information for informing the decoder about the delay between the watermark detection and the desired action, which corresponds to the delay between the time segment in which the watermark is embedded and the original desired time segment.

There is a tradeoff between the flexibility in choosing the optimum watermark insertion time and the amount of the payload (bits) assigned to the delay information.

Figure 5:
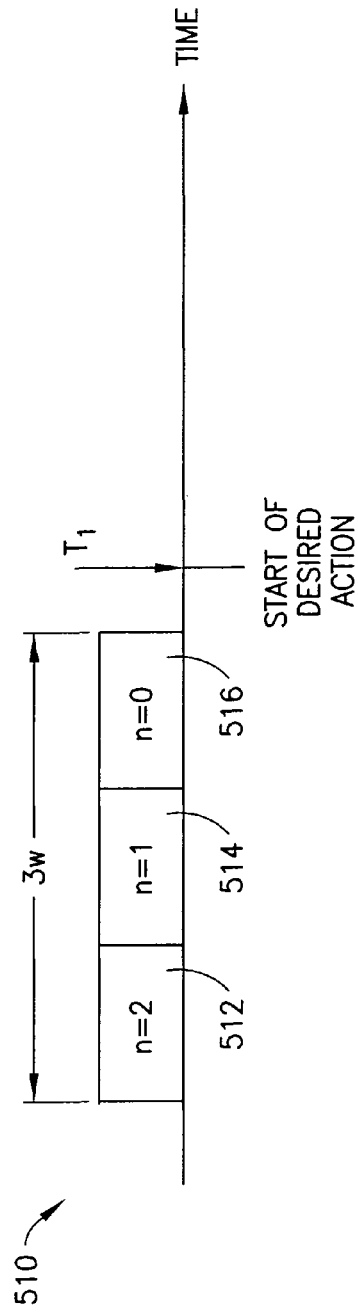
FIG. 5 illustrates the use of countdown watermarks for defining a start time of a desired action in accordance with the present invention.

FIG. 5 illustrates the use of countdown watermarks for defining a start time of a desired action in accordance with the present invention.

In a further alternative embodiment, a string of watermarks 510 is embedded before the desired start of action ($T_1$). Each watermark, such as watermarks 512, 514 and 516, has a countdown data field (n=2, 1, 0) that indicates the number of remaining watermarks before ($T_1$). Detection of any of the watermarks in the string 510 allows the calculation of the desired timing of the action. For example, if the countdown field of a particular watermark contains the countdown field value n, and the watermark duration is w seconds, than the desired action should begin n*w seconds after the particular watermark is detected, plus some additional propagation and processing delay.

This provides improved robustness since the start time of the desired action is designated with redundance. Thus, even if all but one of the watermarks are not received correctly, the start time will be still be designated.

Figure 6:
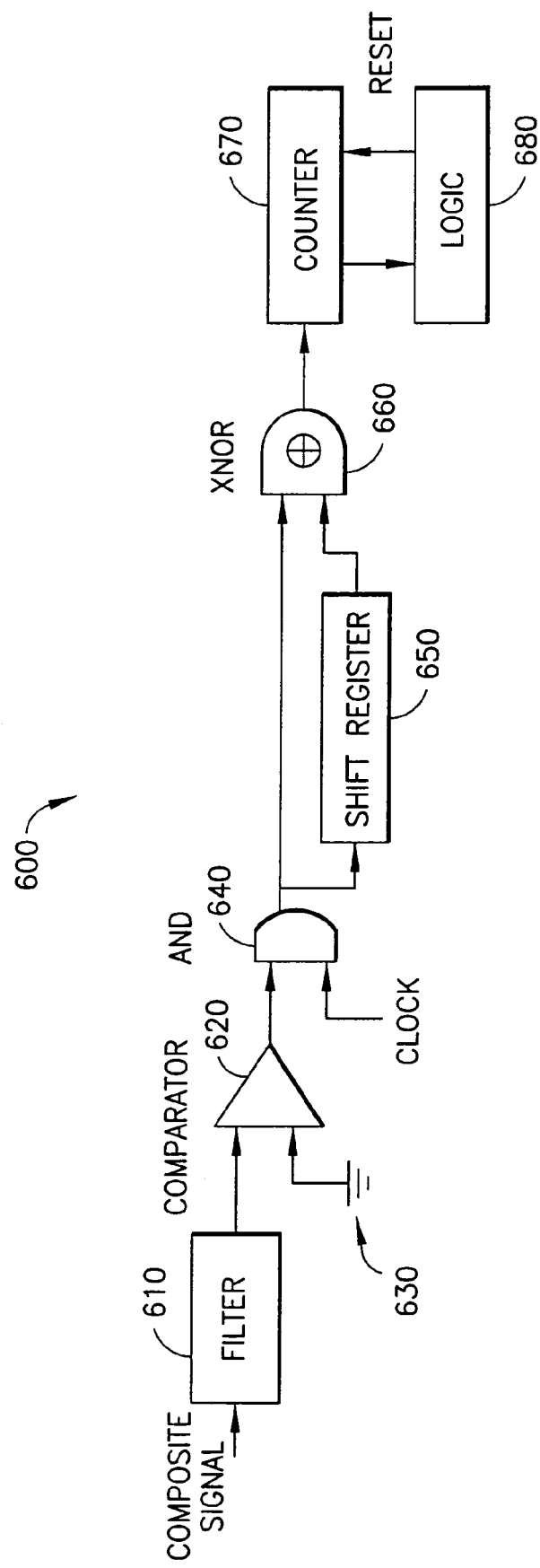
FIG. 6 illustrates an autocorrelation modulation extractor based on sign correlation in accordance with the present invention.

FIG. 6 illustrates an autocorrelation modulation extractor based on sign correlation in accordance with the present invention.

The simple decoder design described in the aforementioned U.S. Pat. No. 5,940,135 includes a filter, followed by a delay line, correlator (multiplier), and an integrator. The output of the integrator represents a base-band watermark signal without normalization. When a binary message has been embedded, the output is positive at the decision moment if a "one" bit is embedded, or negative for a "zero" bit. In this design, it is important to maintain a very precise delay in the delay line; small errors in the delay can bring significant distortion of the watermark signal. Those skilled in the art know that precise delays are best achieved by a digital delay line. This means that an A/D converter is necessary prior to the delay line, which add to the cost of the decoder.

In accordance with the present invention, the decoder of U.S. Pat. No. 5,940,135 can be further simplified as shown in FIG. 6 to meet even lower cost demands, suitable for toy applications, without compromising the delay precision.

This decoder 600 includes a filter 610 that receives the composite signal with the watermark, e.g., from a channel or a storage device, and a comparator 620 for comparing the filtered signal to ground 630. An AND gate 640 receives the output of the comparator 620, and a local clock signal. An XNOR (exclusive-NOR) gate 660 receives a direct output of the AND gate 640, as well as a shifted version of the output via shift register 650. The output of the XNOR gate 660 is provided to a counter 670, which communicates with a logic function 680.

Thus, instead of multiplying the received signal with a delayed version of itself, it is possible to detect the signal polarity, and then perform an XNOR operation between the signal and a delayed version of itself (i.e., if the signs are the same, the output is one, if opposite, the output is zero). Then, instead of integration, it is enough to run the counter 670 at a clock rate that is much higher than the bit rate for the duration of the watermark bit. If the count at the end of the bit interval is more than half the maximum count, then a "one" bit is detected; otherwise a "zero" bit is detected. A synchronizing algorithm, residing in the logic block 680, determines the beginning and the end of the bit interval, and generates a reset signal for the counter at the end of each bit.

The above simplification shows that the comparator substitutes for an A/D converter, the XNOR gate 660 replaces a multiplicator, and the counter 670 substitutes for an integrator. Moreover, the present inventors have confirmed through experimentation that the proposed simplification does not significantly reduce robustness.

Figure 7:
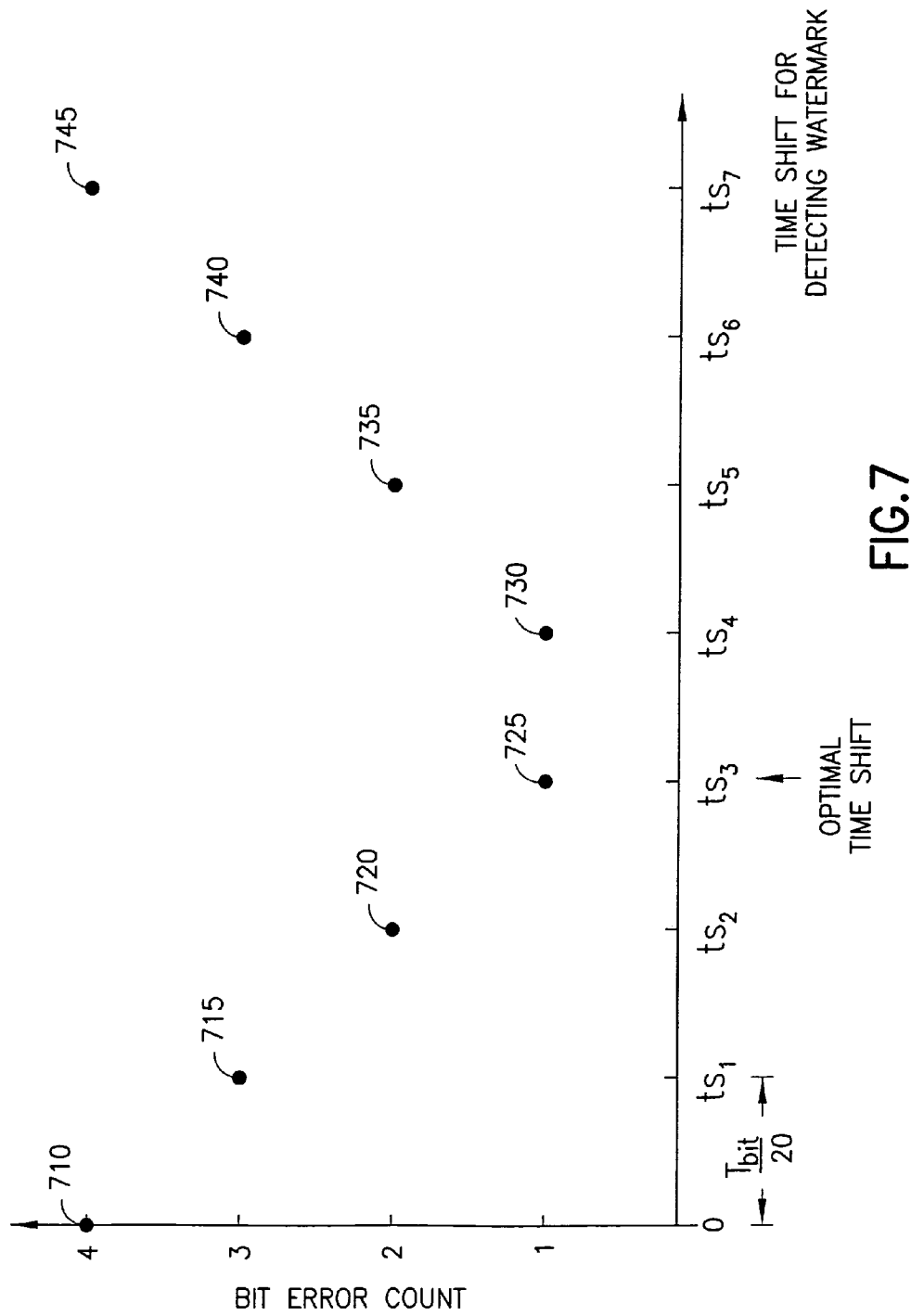
FIG. 7 illustrates an example of a bit error count versus a time shift for detecting a watermark in accordance with the present invention.

FIG. 7 illustrates an example of a bit error count versus a time shift for detecting a watermark in accordance with the present invention.

In the time gate applications in particular, but in other triggering applications as well, it is important to achieve a good timing precision in detecting the end of a watermark. In the case of watermarks described in U.S. Pat. No. 5,940,135, this is equivalent to detecting the trailing edge of the last bit of the watermark bit stream. However, noise and channel distortions can corrupt the trailing edge of any bit, or the bit as a whole. Therefore, it is necessary to take the watermark in its totality to decide the most probable timing of the end of the watermark.

In typical digital watermarks described in U.S. Pat. No. 5,940,135, error correction codes are used to recover watermarks in the case when some bits are corrupted. In this case, the watermark can be detected at a time interval that is slightly earlier than its optimal position, but with a higher error count than in its optimal position. The present invention modifies this scheme propose to use this feature to further optimize the watermark timing detection.

In accordance with the present invention, the decoder will attempt to detect the watermark with a starting and ending position that are delayed slightly with respect to the timing position where initial detection of the watermark occurred. The time shifts are very small with respect to the watermark duration, typically of the order of 5% of the bit interval ($T_{bit}$) (each watermark contains tens or even hundreds of bits). In each of these shifts, the decoder will continue to detect the same watermark and monitor the bit error count over the duration of the watermark. The same watermark is detectable even with slight time shifts, which is the basis of the precise time resolution disclosed herein. The optimum timing is found where the error count is minimized. For multiple minimums, the optimum timing can be taken at the midpoint.

For example, in FIG. 7, the error count changes as the detecting time is shifted. Initially, with no time shift (i.e., at the originally-detected position), the watermark is detected with four bits in error (point 710). However, as the detecting time is shifted in steps of ts (e.g., ts=$T_{bit}/20$), the error count decreases (points 715 and 720), reaches a minimum for two shifts (points 725 and 730), and then increases (points 735, 740 and 745).

A minimum bit error (points 725 and 730) is reached for two consecutive steps, and we conclude that the best estimate for a reference position of the watermark (which can be, e.g., the ending time of the watermark) is at the mid-point of these two events, i.e., at ($ts_3$+$ts_4$)/2. Alternatively, either $ts_3$ or $ts_4$ could be selected. The resolution of the extractor's clock will govern the minimum possible time shift.

If only one minimum is found, the optimum position is taken at that time shift position.

To reduce computations, it is possible to terminate the bit error calculations once a minimum has been detected and the bit error count begins to rise (e.g., at point 735). Also, optionally, the bit error calculations can be terminated when a bit error count of zero is first reached.

As an numeric example, assume the watermark message is two seconds long, and $T_{bit}$=0.08 sec. Let us say that watermark is first detected in the audio signal starting at time 12.340 sec. and ending at time 14.340 sec. This corresponds to a zero time shift. Then, with ts1=0.08/20=0.004 sec., the watermark is next detected starting at time 12.344 sec., and ending at time 14.344 sec., and so forth. Note that the detection interval is 2 sec., and the position shift, and the resolution, is 0.004 sec.

Moreover, for a strong watermark, the error count may reach zero or some other minimum value for several time shifts. In this case, the optimum timing is again set in the middle of the time intervals with the minimum errors.

Experiments show that this technique detects the watermark with the precision of +/−20% of the bit interval. For example, for watermarks running at a 50 bit/sec. rate, this corresponds to a time resolution of +/−4 ms. This resolution corresponds to +/−1.4 meters of acoustic propagation delay, so it is adequate for the systems based on acoustic coupling.

Accordingly, it can be seen that the present invention provides a method and apparatus with various advantages, including:

allows remote control of a device, such as a toy, lock, smart card, or home appliance, via a control message that is imperceptibly embedded in an audio signal as a watermark;

is compatible with, and builds upon, existing watermarking techniques;

allows the remote control signal to be synchronized with the audio content, such as to allow a toy to move in conjunction with the audio track of a children's television program;

uses a watermark to define a time gate (window) during which a device is enabled to receive a user input;

provides a security mechanism to ensure that the time gate is defined only from a real-time broadcast audio signal, and not from a replay of the audio signal;

provides a simplified watermark detector;

improves the robustness and temporal resolution of a watermark, e.g., in acoustic propagation channels, by shifting the detecting point based on an error count of the watermark; and improves robustness by evaluating the masking ability of the host audio signal when embedding the watermark, and inserting the watermark in a suitable interval before the desired action, along with information indicating the time shift, if necessary.

Although the invention has been described in connection with various specific embodiments, those skilled in the art will appreciate that numerous adaptations and modifications may be made thereto without departing from the spirit and scope of the invention as set forth in the claims.

What is claimed is:

1. A method, comprising:
   receiving a media content that is embedded with at least a first substantially imperceptible watermark at a user device, said media content having been acoustically propagated to said user device, and wherein said at least first substantially imperceptible watermark includes designed characteristics that improve watermark robustness against impairments due to acoustic propagation of said media content;
   recovering one or more of said embedded watermarks at said user device;
   commencing a time gate in response to the recovery of said one or more embedded watermarks; and
   enabling a user action in accordance with said one or more recovered watermarks and said time gate.

2. The method of claim 1, wherein said user action is not permitted outside a duration of said time gate.

3. The method of claim 1, wherein said user action is not permitted within a duration of said time gate.

4. The method of claim 1, wherein said user action is permitted after a fixed time from the recovery of said one or more watermarks.

5. The method of claim 1, wherein said one or more watermarks comprise timing information and said user action is controlled in accordance with said timing information.

6. The method of claim 5, wherein said user action is permitted when locally generated time at said user device matches said timing information.

7. The method of claim 5, wherein said user action is permitted when locally generated time at said user device is within a predefined value of said timing information.

8. The method of claim 1, wherein said one or more watermarks comprise a counter and said time gate is commenced in accordance with a predefined relationship to said counter.

9. The method of claim 1, wherein said one or more watermarks comprise duration information of said time gate.

10. The method of claim 1, wherein boundaries of said time gate are determined in accordance with a start and a stop watermark.

11. The method of claim 1, wherein said user device is adapted to provide a response to said user action occurring within a duration of said time gate.

12. The method of claim 11, wherein said response to said user action comprises storing information related to said user action.

13. The method of claim 11, wherein said response to said user action comprises relaying information related to said user action to a different device.

14. The method of claim 1, wherein said device is adapted to store information corresponding to said user action.

15. The method of claim 1, wherein said device is adapted to relay information related to said recovered one or more watermarks to a different device.

16. The method of claim 15, wherein said different device comprises one of a television or a computer.

17. The method of claim 1, wherein the starting and ending time points of said time gate are signaled using at least a portion of the payload of said one or more recovered watermarks.

18. The method of claim 1, wherein said designed characteristics improve watermark robustness against intersymbol interference due to multipath propagation of said media content.

19. The method of claim 1, wherein said designed characteristics comprise distinct signaling channels associated with adjacent bits of said first imperceptible watermark.

20. The method of claim 1, wherein the start of said time gate is signaled using a plurality of embedded watermarks, and wherein recovery of any one of said plurality of embedded watermarks allows a calculation of the starting time point of said time gate.

21. The method of claim 1, wherein recovery of one or more of said embedded watermarks comprises:
   detecting a particular watermark from an initial position within said media content;

detecting said particular watermark at a plurality of positions within said media content, wherein each of said plurality of positions is shifted in time with respect to said initial position;

for each of said plurality of positions, determining a number of recovered erroneous bits associated with said detected watermark; and selecting the position associated with fewest number of recovered erroneous bits as the detected position of said particular watermark within said media content.

22. The method of claim 1, wherein said at least first substantially imperceptible watermark is embedded in said media content at least in part by:

evaluating masking ability of said media content;

embedding said at least first substantially imperceptible watermark in a first segment of said media content based on said masking ability, said at least first substantially imperceptible watermark comprising information indicative of a delay associated with recovery of said at least first substantially imperceptible watermark from said first segment and enabling said user action coinciding with a second segment of said media content.

23. The method of claim 1, wherein said media content is embedded with multiple substantially imperceptible watermarks and wherein recovery of any one of said multiple substantially imperceptible watermarks can commence said time gate.

24. A method for controlling a user's interactions with a media content, comprising:

embedding at least a first imperceptible watermark in said media content, wherein said at least first imperceptible watermark includes designed characteristics that improve watermark robustness against impairments due to acoustic propagation of said media content; and wherein said at least first imperceptible watermark is adapted to trigger the commencement of a time gate once said media content is acoustically propagated and received at a user device, and once said watermark is recovered at the user device from said received media content such that a user action is enabled in accordance with said recovered watermark and said time gate.

25. The method of claim 24, wherein said user action is not permitted outside a duration of said time gate.

26. The method of claim 24, wherein said user action is not permitted within a duration of said time gate.

27. The method of claim 24, wherein said user action is permitted after a fixed time from the recovery of said watermark.

28. The method of claim 24, wherein said watermark comprises timing information and said user action is controlled in accordance with said timing information.

29. The method of claim 28, wherein said user action is permitted when locally generated time at said user device matches said timing information.

30. The method of claim 28, wherein said user action is permitted when locally generated time at said user device is within a predefined value of said timing information.

31. The method of claim 24, wherein said watermark comprises a counter and said time gate is commenced in accordance with a predefined relationship to said counter.

32. The method of claim 24, wherein said watermark comprises duration information of said time gate.

33. The method of claim 24, wherein boundaries of said time gate are determined in accordance with a start and a stop watermark.

34. The method of claim 24, wherein said user device is adapted to provide a response to said user action occurring within a duration of said time gate.

35. The method of claim 34, wherein said response to said user action comprises storing information related to said user action.

36. The method of claim 34, wherein said device response to said user action comprises relaying information related to said user action to a different device.

37. The method of claim 24, wherein said device is adapted to store information corresponding to said user action.

38. The method of claim 24, wherein said device is adapted to relay information related to said recovered watermark to a different device.

39. The method of claim 38, wherein said different device comprises one of a television or a computer.

40. A method for remotely controlling a device using a media content, comprising:

receiving a media content that is embedded with at least a first substantially imperceptible watermark at a user device, said media content having been acoustically propagated to said user device, wherein said at least first imperceptible watermark includes designed characteristics that improve watermark robustness against impairments due to acoustic propagation of said media content;

recovering one or more of said embedded watermarks at said user device; and triggering an action at said user device within a time gate in accordance with said one or more recovered watermarks.

41. The method of claim 40, wherein said action comprises at least one of:

movement of a mechanical component;

displaying a message;

storing a user response; or transmitting information to a different device.

42. A method for remotely controlling a device using a media content, comprising:

embedding a media content with at least a first substantially imperceptible watermark, wherein said at least first imperceptible watermark includes designed characteristics that improve watermark robustness against impairments due to acoustic propagation of said media content; and communicating said watermarked media content to said user device;

wherein said communicating comprises acoustic propagation of said media content to said user device, and wherein upon the reception of said watermarked media content by said user device one or more of said watermarks is recovered, and an action is triggered within a time gate in accordance with said one or more recovered watermarks.

43. The method of claim 42, wherein said action comprises at least one of:

movement of a mechanical component;

displaying a message;

storing a user response; or transmitting information to a different device.

44. A device, comprising:

a receiver configured to receive an acoustically propagated media content that is embedded with at least a first substantially imperceptible watermark, wherein said at least first imperceptible watermark includes designed characteristics that improve watermark robustness against impairments due to acoustic propagation of said media content;

an extractor configured to recover one or more of said embedded watermarks; and a control module configured to commence a time gate in response to the recovery of said one or more embedded watermarks, thereby enabling a user action in accordance with said one or more recovered watermarks and said time gate.

45. The device of claim 44, wherein said control module is configured not to permit said user action outside a duration of said time gate.

46. The device of claim 44, wherein said control module is configured not to permit said user action within a duration of said time gate.

47. The device of claim 44, wherein said control module is configured to permit said user action after a fixed time from the recovery of said one or more watermarks.

48. The device of claim 44, wherein said one or more watermarks comprise timing information and said control module is configured to control said user action in accordance with said timing information.

49. The device of claim 48, wherein said user action is permitted when locally generated time at said user device matches said timing information.

50. The device of claim 48, wherein said user action is permitted when locally generated time at said user device is within a predefined value of said timing information.

51. The device of claim 44, wherein said one or more watermarks comprise a counter and said control module is configured to commence said time gate in accordance with a predefined relationship to said counter.

52. The device of claim 44, wherein said one or more watermarks comprise duration information of said time gate.

53. The device of claim 44, wherein said control module is configured to determine boundaries of said time gate in accordance with a start and a stop watermark.

54. The device of claim 44, wherein said user device is adapted to provide a response to said user action occurring within a duration of said time gate.

55. The device of claim 44, further configured to store storing information related to said user action.

56. The device of claim 44, further configured to relay information related to said user action to a different device.

57. The device of claim 56, wherein said different device comprises one of a television or a computer.

* * * * *